United States Patent
Gaur et al.

(10) Patent No.: US 12,072,897 B2
(45) Date of Patent: Aug. 27, 2024

(54) SIMILARITY SEARCHING ACROSS DIGITAL STANDARDS

(71) Applicants: SAE International, Warrendale, PA (US); COGNISTIC LLC, Pittsburgh, PA (US); Sigma Resources LLC, Pittsburgh, PA (US)

(72) Inventors: Divyesh Gaur, Pittsburgh, PA (US); Suman Ghosh, Monroeville, PA (US); Jean De Dieu Iradukunda, Pittsburgh, PA (US); Audra Ziegenfuss, Baden, PA (US); Uxue Zurutuza Dorronsoro, Pittsburgh, PA (US)

(73) Assignee: SAE INTERNATIONAL, Warrendale, PA (US)

( * ) Notice: Subject to any disclaimer, the term of this patent is extended or adjusted under 35 U.S.C. 154(b) by 68 days.

(21) Appl. No.: 17/183,048

(22) Filed: Feb. 23, 2021

(65) Prior Publication Data
US 2022/0269685 A1    Aug. 25, 2022

(51) Int. Cl.
*G06F 16/2457*    (2019.01)
(52) U.S. Cl.
CPC .............................. *G06F 16/24578* (2019.01)
(58) Field of Classification Search
CPC .... G06F 16/24578; G06F 16/93; G06F 16/35; G06F 16/31
See application file for complete search history.

(56) References Cited

U.S. PATENT DOCUMENTS

| | | | | |
|---|---|---|---|---|
| 5,659,742 A | * | 8/1997 | Beattie ..................... | G06F 16/40 |
| 8,756,236 B1 | * | 6/2014 | Procopio ............... | G06F 16/313 |
| | | | | 707/738 |
| 2005/0125261 A1 | * | 6/2005 | Adegan .................. | G06Q 40/08 |
| | | | | 705/4 |
| 2008/0162455 A1 | * | 7/2008 | Daga ...................... | G06F 16/313 |
| | | | | 707/999.005 |

(Continued)

FOREIGN PATENT DOCUMENTS

| | | | | |
|---|---|---|---|---|
| EP | 3273391 A1 | * | 1/2018 | ............. G06Q 10/20 |
| JP | 2007334506 A | * | 12/2007 | |

OTHER PUBLICATIONS

International Search Report for PCT Application PCT/US2022/017292, May 5, 2022, 4 pages.

*Primary Examiner* — James E Richardson
(74) *Attorney, Agent, or Firm* — FERENCE & ASSOCIATES LLC; Gregory L. Bradley, Esq

(57) ABSTRACT

One embodiment provides a method for identifying similar objects by performing document attribute comparisons, the method including: receiving a reference document, wherein the reference document corresponds to an object and comprises a plurality of attributes of the object; receiving a request for a similarity comparison, wherein the request provides an indication of similarity attributes to be used in the similarity comparison; comparing the reference document to each of a plurality of documents corresponding to other objects; generating a document similarity score for each of the plurality of documents, wherein the document similarity score is generated based upon an aggregation of (Continued)

similarity attribute scores calculated for each of the similarity attributes; and providing at least one of the plurality of documents with an indication of a similarity. Other aspects are described and claimed.

20 Claims, 6 Drawing Sheets

(56) References Cited

U.S. PATENT DOCUMENTS

| | | | |
|---|---|---|---|
| 2008/0189260 A1* | 8/2008 | Arnold | G06F 16/58 |
| | | | 707/999.005 |
| 2008/0243842 A1* | 10/2008 | Liang | G06F 16/93 |
| 2012/0254165 A1 | 10/2012 | Brdiczka et al. | |
| 2019/0171545 A1* | 6/2019 | Hess | G06F 11/3608 |
| 2020/0050949 A1* | 2/2020 | Sundararaman | G06F 40/284 |
| 2020/0110769 A1* | 4/2020 | Kummamuru | G06F 16/35 |
| 2020/0125648 A1* | 4/2020 | Jiang | G06F 16/93 |
| 2021/0011935 A1* | 1/2021 | Walsh | G06Q 50/184 |
| 2021/0109892 A1* | 4/2021 | Groff | G06F 16/248 |

* cited by examiner

SIMILARITY SEARCHING ACROSS DIGITAL STANDARDS

BACKGROUND

Standards are very important to many different industries. The use of standards ensures consistency across an industry regardless of the entity that is manufacturing, producing, maintaining, implementing, or otherwise interacting with the object or service that corresponds to the standard. For example, the transportation industry has standards that are related to materials and parts that are included within an automobile, airplane, helicopter, train, or other transportation vehicles. These standards may identify the properties (e.g., size, material, tensile strength, sheer force, tolerances, etc.) of each object within or making up the transportation vehicle (e.g., bolts, sheet metal, nuts, rivets, pistons, safety features, etc.). The standards are created by a governing body of the industry that then passes the standards onto the manufacturers, suppliers, assemblers, repairers, and other entities within the industry. Adherence to these standards is critical to ensuring consistency and safety across the industry. Alternatively, the standards may be internal standards that are developed by a company and are then expected to be adhered to throughout the company.

BRIEF SUMMARY

In summary, one aspect provides a method for identifying similar objects by performing document attribute comparisons, the method comprising: receiving a reference document, wherein the reference document corresponds to an object and comprises a plurality of attributes of the object, each of the attributes having a data type; receiving, from a user, a request for a similarity comparison based upon the reference document, wherein the request provides an indication of similarity attributes to be used in the similarity comparison; comparing the reference document to each of a plurality of documents corresponding to other objects, wherein the comparing comprises substituting a data type of each of the similarity attributes with a defined data type and performing a comparison of the similarity attributes having the substitute data types wherein the comparison performed is based upon the substitute data type of a given similarity attribute; generating a document similarity score for each of the plurality of documents based upon the comparing, wherein the document similarity score is generated based upon an aggregation of similarity attribute scores calculated for each of the similarity attributes and being determined from the comparison; and providing, to the user, at least one of the plurality of documents with an indication of a similarity of the at least one of the plurality of documents to the reference document, the indication of similarity being based upon a document similarity score corresponding to the at least one of the plurality of documents.

Another aspect provides a system for identifying similar objects by performing document attribute comparisons, the system comprising: one or more processors; a memory device that stores instructions executable by the processor to: receive a reference document, wherein the reference document corresponds to an object and comprises a plurality of attributes of the object, each of the attributes having a data type; receive, from a user, a request for a similarity comparison based upon the reference document, wherein the request provides an indication of similarity attributes to be used in the similarity comparison; compare the reference document to each of a plurality of documents corresponding to other objects, wherein the comparing comprises substituting a data type of each of the similarity attributes with a defined data type and performing a comparison of the similarity attributes having the substitute data types wherein the comparison performed is based upon the substitute data type of a given similarity attribute; generate a document similarity score for each of the plurality of documents based upon the comparing, wherein the document similarity score is generated based upon an aggregation of similarity attribute scores calculated for each of the similarity attributes and being determined from the comparison; and provide, to the user, at least one of the plurality of documents with an indication of a similarity of the at least one of the plurality of documents to the reference document, the indication of similarity being based upon a document similarity score corresponding to the at least one of the plurality of documents.

A further aspect provides a product for identifying similar objects by performing document attribute comparisons, the product comprising: a storage device that stores code, the code being executable by one or more processors and comprising: code that receives a reference document, wherein the reference document corresponds to an object and comprises a plurality of attributes of the object, each of the attributes having a data type; code that receives, from a user, a request for a similarity comparison based upon the reference document, wherein the request provides an indication of similarity attributes to be used in the similarity comparison; code that compares the reference document to each of a plurality of documents corresponding to other objects, wherein the comparing comprises substituting a data type of each of the similarity attributes with a defined data type and performing a comparison of the similarity attributes having the substitute data types wherein the comparison performed is based upon the substitute data type of a given similarity attribute; code that generates a document similarity score for each of the plurality of documents based upon the comparing, wherein the document similarity score is generated based upon an aggregation of similarity attribute scores calculated for each of the similarity attributes and being determined from the comparison; and code that provides, to the user, at least one of the plurality of documents with an indication of a similarity of the at least one of the plurality of documents to the reference document, the indication of similarity being based upon a document similarity score corresponding to the at least one of the plurality of documents.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
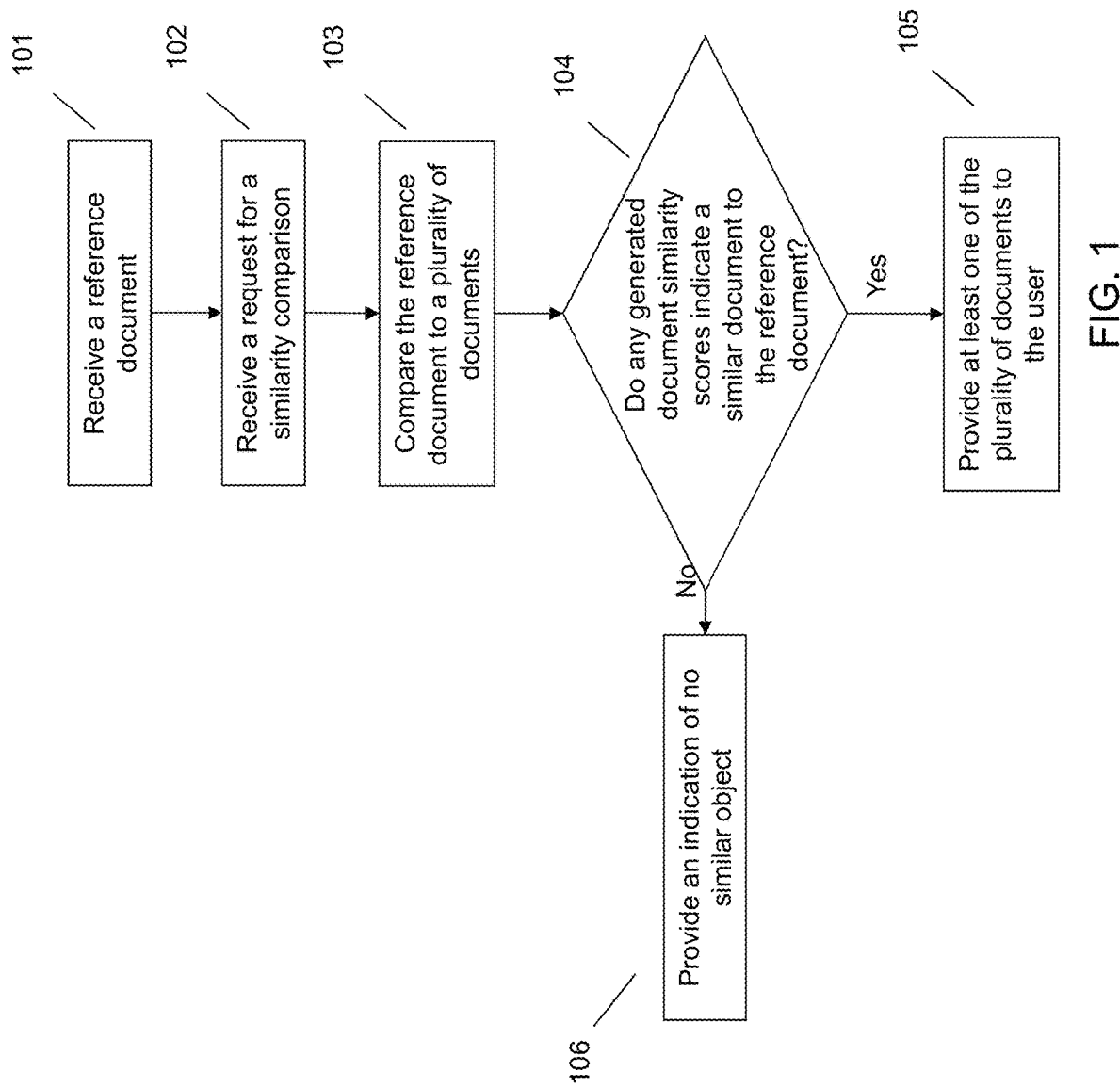
FIG. 1 illustrates an example method for identifying similar objects by performing document attribute comparisons.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Standards for industries (e.g., transportation, energy, manufacturing, engineering, etc.) are very complex and extensive. Governing bodies, including internal company governing bodies, which create the standards typically spend significant amounts of time, for example, years, presenting, revising, and adopting a single standard. Since the standards document includes multiple requirements and data specific to an object (e.g., part, material, process, management approach, etc.), for global industry or companywide adoption, the length of time to create the standards document is quite significant. Once the standards document is created, it is available to any applicable entity to make sure that consistency and adherence to the standards is maintained throughout an industry, company, or other entity. Typically, the standards document is a paper document or pdf. When revisions to a standard are introduced, the standard is updated with a revised document which supersedes the earlier version. These revisions then have to be available to any applicable entity.

With the increase in technology, distribution of the standards documents and revisions has become easier since they can be provided on a technological platform (e.g., server, Internet website, data storage location, etc.) that can then be accessed by anyone who wants or needs access to the standards document. However, as with the paper or pdf versions of the standards, this technique of merely uploading or saving the standards and revisions to a data repository has some drawbacks, particularly for those users within the industry that need to access and implement the standards.

One problem with this technique is that while the standards are now in an electronic form (i.e., pdf), that electronic format is effectively similar to the paper copies in that it cannot be searched and finding information related to a particular part, requirement, specification, material, regulation, standard or the like, is time intensive. While some conventional techniques allow for conversion of the electronic version of the standard to a searchable format, for example, through optical character recognition, this conversion only slightly reduces the amount of time it takes to find target information. In this case, the user must select a search term that will result in the desired information. Additionally, since the format of the standards from paper to electronic form remains largely unchanged, even if converted to a searchable format, it is still difficult to find target information.

In order to overcome this problem, the standards are being converted to digital standards. The term "digital standard" as used herein is more than a simple conversion of the paper standards to a digital format, for example, by saving it in a digital format or even converting it to a searchable format, for example, by using text recognition techniques. Rather, the term "digital standard" refers to not only the conversion of the paper standard to an electronic format, but more specifically, the data structure and data model describing the interaction and relationships among different aspects within a given standard, between a given standard and other standards, and between a given standard and other documents, applications, and/or data sources.

Furthermore, when an application is built which accesses data from the data stores just described, the digital format adds functionality to the standard that allows for users within an industry to view information for a particular part, material, standard, requirement, regulation, or the like, in a display where the user can interact with the information to identify sources of the information, view sections, data, and requirements of a standard, find related information, and the like. In other words, "digital standards" refers to not only the digitization of the paper standard, but also the digital layout, data model and schema, and digital functionality included with the digitization of the standard. More details regarding generating the digital standards can be found in U.S. patent application Ser. No. 16/905,559, filed on Jun. 17, 2020, the contents of which are incorporated by reference herein as if set forth in its entirety.

By converting the standards to digital standards, additional functionality can be added to the digital standards. One example of this additional functionality is provided in the systems and methods as described herein by providing a mechanism that allows for identifying similarities across digital standards. For example, a user may want to identify an object (e.g., material, part, regulation, management technique, etc.) represented by a digital standard that is similar to an identified object and also represented by a digital standard. For example, the user may determine that one part is unavailable for purchase or use and may want to identify a similar part that could be used in place of the unavailable part. Since both the unavailable part and the other parts have been converted to digital standards, the described system is able to perform a comparison of the unavailable part to other parts represented by digital standards to find and identify a similar part. Similar similarity searches can be performed for any object represented by digital standards and is not just limited to parts.

Not only is the ability to search and find similar objects across the digital standards unique, but the technique for performing the similarity comparison is also unique. The described similarity comparison allows for faster comparison of objects represented by the digital standards than other similarity comparison techniques that are utilized in comparing documents. One standard technique is for a user to identify attributes of objects for comparison and the system then compares each attribute value from the reference object to any comparison object documents. However, this requires a one-to-one comparison which is very slow. Additionally, if object attributes are not in the same format across all of the documents, this technique may result in inaccurate results from the searching. The described technique, on the other hand, not only allows for a whole comparison of the entire document to another which is quicker, but also allows for comparison of object attributes even if the attributes are not presented in the same format across all documents.

The illustrated example embodiments will be best understood by reference to the figures. The following description is intended only by way of example, and simply illustrates certain example embodiments.

For ease of readability, a few terms will be defined for consistency. However, it should be understood that these definitions are not intended to limit the scope of the described system and method.

The term "digital standard" will refer to the data structure and data models by which information from a given standard is structured and the information that is provided when a user selects content within the data stores or related data stores for viewing. This includes all the information that corresponds to the selected object, for example, across all windows and tabs that are associated with a standard in a user interface.

The term "underlying standard" will refer to the paper or electronic version of the standard. In other words, the term underlying standard refers to the standard that is issued by the governing body associated with the standard document. The term underlying standard also includes revisions to the standard.

The term "governing body" will refer to the entity that issues the underlying standard. This can be a governing body of an entire industry, for example, the transportation, energy, engineering, or the like, industry. Governing body may also refer to an internal governing body, for example, a group or individual within a company that creates and/or issues standards to be utilized within the company or other entity.

The term "aspect" will refer to a section or portion of the digital standard, with each section or portion providing information corresponding to the aspect. Within the user interface, the digital standard may be presented in multiple tabs with each corresponding to a different aspect of the digital standard. Example aspects include composition, properties, sections, requirements, revision history, and the like.

The term "object" will refer to a thing that a user is attempting to locate information for. An object may be any material, part, regulation, standard, specification, or the like, that has a corresponding digital standard. Thus, the term "object" may not only refer to physical things but may also refer to groups of words or digital things, for example, regulations, standards, or data. The term "object" may also refer to a thing made up of other objects. For example, the term "object" refers to both a single bolt and an entire automobile.

An "attribute" refers to a property of an object. The object property may be a physical property, for example, size, pitch, material, or the like. The object property may also be an inherent property, for example, sheer force value, heat resistance value, water resistance value, impact rating, load rating, or the like. The object property may also be a manufacturing property, for example, manufacturing technique (e.g., naturally aged, heat treated, etc.), plating types, or the like. The object property may also be a performance property, for example, typical application, typical cycle time, number of cycles per minute, fluid displacement amount, or the like. Essentially the object property may be any property that is used to identify, utilize, manufacture, or distinguish the object.

A "category type" or "standards category" refers to an overarching category of objects or standards types. For example, an object may be a particular bolt, and the category type may be Parts. As another example, an object may be Non-Ferrous Alloys, and the category type may be Materials Standards or Metals.

A "user" refers to a person or entity interfacing with the user interface and digital standard. The term "user" does not necessarily refer to a specific person and may refer to an entire entity and those people within the entity that can access the user interface. For example, a manufacturer of an object is an entity and will be referred to as a user. However, it should be understood that different people within the entity can access and utilize the described system and method.

FIG. 1 illustrates an example technique for identifying similar objects by performing document attribute comparisons. At 101 the system may receive a reference document corresponding to an object. In the use case of digital standards, the reference document may be a digital standard corresponding to an object. Thus, the reference document may include a plurality of attributes of the object. For example, if the reference document corresponds to a material, the attributes may include physical properties of the material, one or more compositions of the material, and the like. As another example, if the reference document corresponds to a part, the attributes may include physical properties of the part, alloys of the part, applications of the part, and the like.

Each of the attributes has a corresponding data type. The data type refers to the value type or format of the attribute. In other words, the data type refers to how the attribute value is provided within the document. For example, a range data type indicates that the attribute value is provided as an interval of continuous values. The range value type may also have an associated delta which indicates that the range may also include +/− an additional value. As another example, a static data type indicates that the attribute value is provided as a discrete real number. As a final example, a string data type indicates that the attribute value is provided as a string of characters which could include numbers, letters, symbols, or the like. These data types are merely examples and other data types are possible.

Receiving the reference document may include a user accessing a user interface, providing search criteria related to content within data stores or related data stores, and receiving information related to the provided search criteria. For example, if a user is attempting to locate a particular part, material, or other object, the user may access a user interface and provide search criteria within the user interface corresponding to the desired part, material, or other object. The system then utilizes the search criteria to query one or more data stores or related data stores to find the reference document corresponding to the search criteria. In the digital standards example, the returned reference document may be all or a portion of the digital standard corresponding to the material, part, or other object corresponding to the search criteria.

Figure 2:
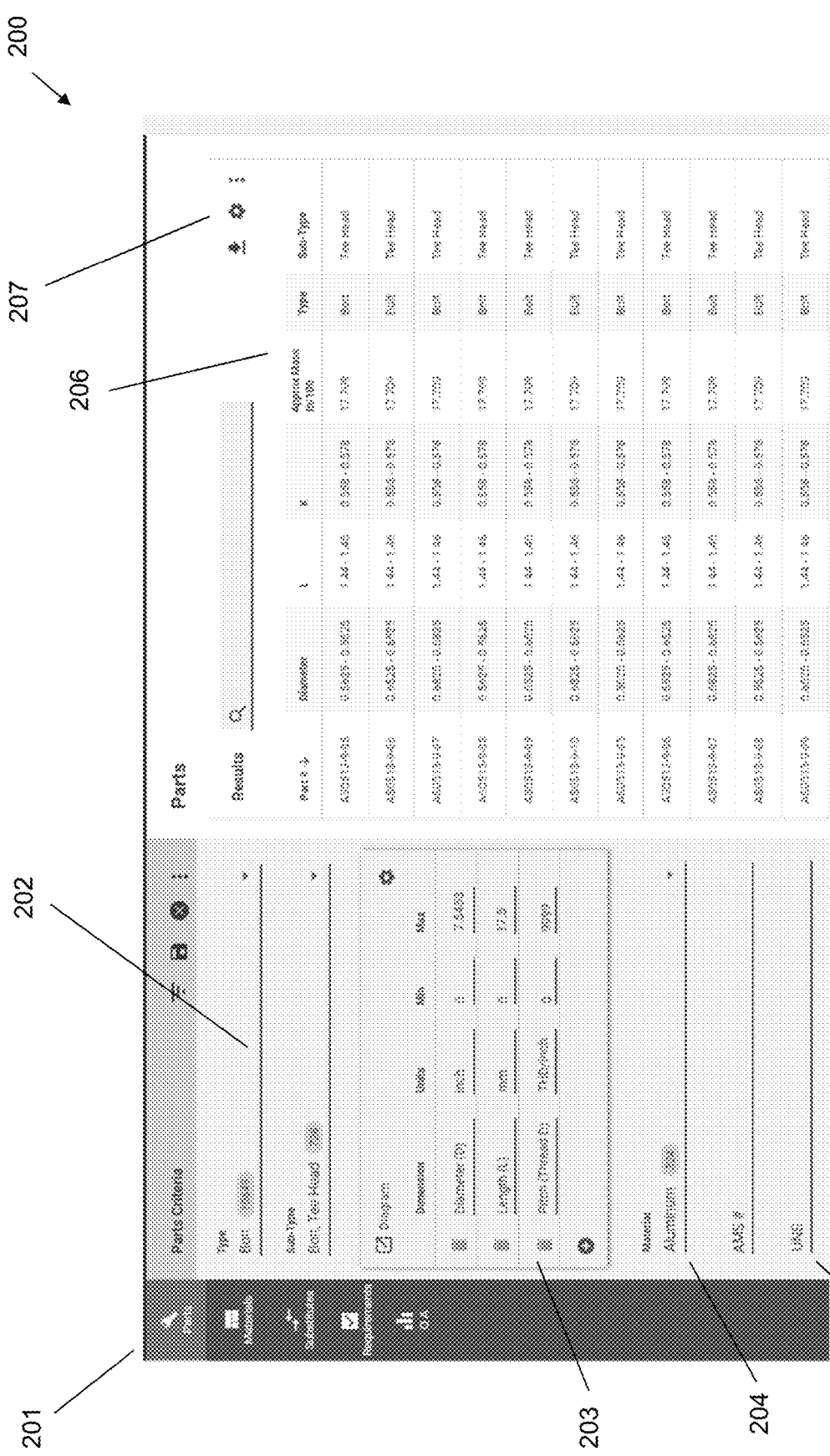
FIG. 2 illustrates an example user interface for displaying and interacting with digital standards.

To provide some background information, a description of a user interface that the user may access is provided in connection with FIG. 2. However, additional details regarding one example user interface that can be utilized for accessing the digital standards or otherwise providing a reference document can be found in U.S. patent application Ser. No. 16/828,254, filed on Mar. 24, 2020, the contents of which are incorporated by reference herein as if set forth in its entirety. FIG. 2 illustrates an example user interface 200 for displaying and interacting with information corresponding to digital standards. The display provides a plurality of icons that are selectable by the user 201. The example icons 201 shown in FIG. 2, are a "home" icon represented by the house icon, a parts icon, a materials icon, a substitutes icon, and a requirements icon. As should be understood, the number of icons and names of the icons can vary. Additionally, the layout or location of the icons can vary. The display may also provide other icons 207 that allow a user to access other information.

At least one of the icons 201 corresponds to a standards category icon that displays information related to a digital standard within the category that corresponds to the icon. As an example, in FIG. 2, both the parts icon and the materials icon correspond to standards category icons. If the parts icon is selected, then digital standards corresponding to parts are searchable and/or displayed. If the materials icon is selected, then digital standards corresponding to materials are searchable and/or displayed. Thus, other possible standards category icons may include a regulation icon, specification icon, object icon, and the like. This list is not exhaustive and is only used for illustrative purposes only. In the example of FIG. 2, a user has selected the parts icon.

In response to a user selecting one of the standards category icons the user interface displays a digital selection field 202. In the example of FIG. 2, the user has selected "Bolt 10649". Upon selection of an object, the user interface may display other input areas 203. Whether other input areas are provided and the information within the other input areas may be based upon the object selected. In this example, another input area 203 has been provided that includes information related to attributes of the object, in this case, diameter, length, and pitch. The system may also display other filters or constraint input areas 204. In this example, the user can limit the object to a particular material type in the filter input area 204. Once the user is satisfied with the provided information, the search results 206 may be populated. The search results display information related to a digital standard that is identified from the provided input. In the event that more than one object fulfills the provided input, the user may be presented with a display that allows the user to select a particular object.

Figure 3:
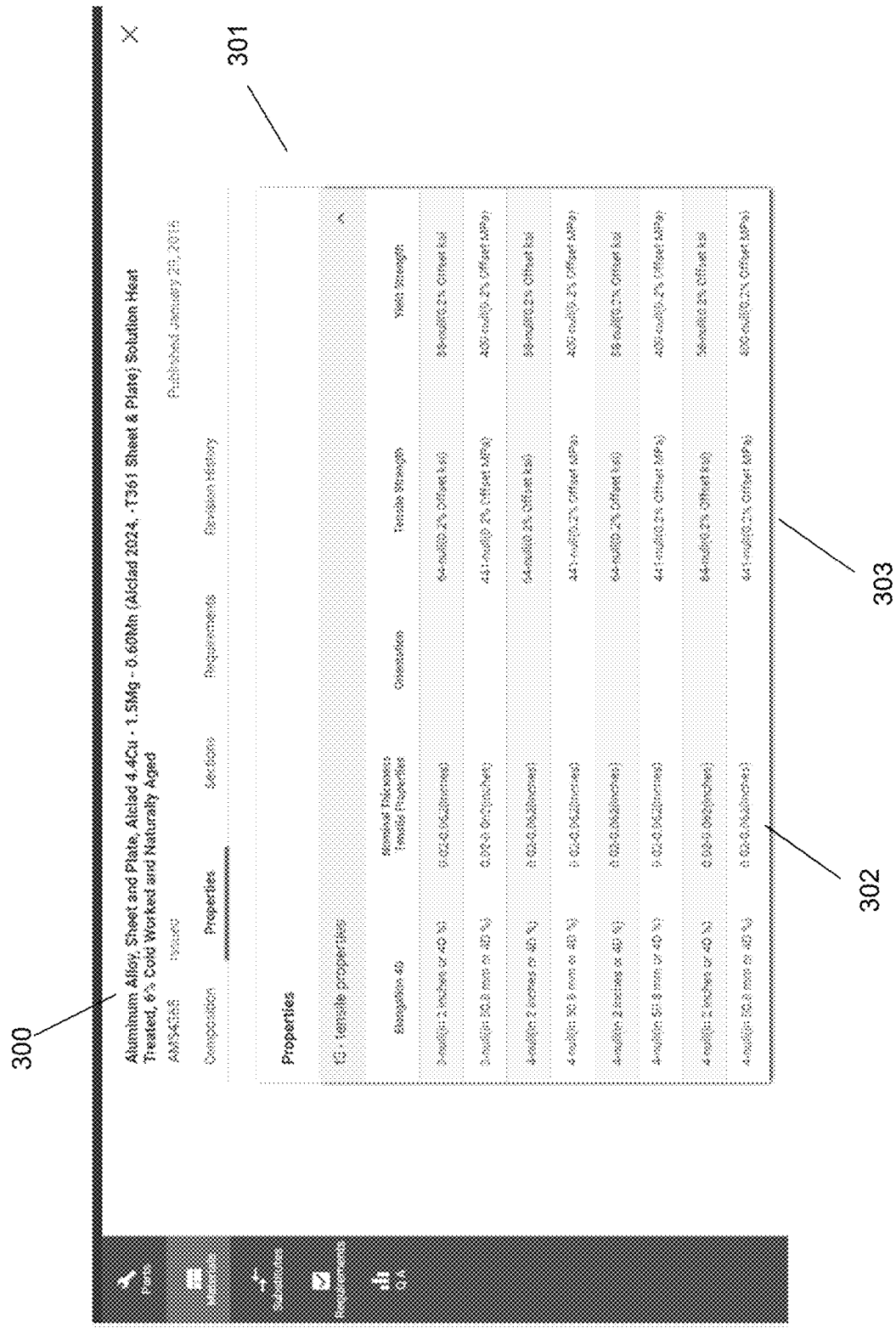
FIG. 3 illustrates an example aggregated table within a properties tab corresponding to a digital standard of a materials category.

FIG. 3 is provided to illustrate an example of the different attributes that may correspond to an object. In the example of FIG. 3 attributes 301, also referred to as properties in FIG. 3, of an object corresponding to a material 300 are illustrated. These are merely example attributes and additional and/or different attributes of an object are possible and are dependent upon the object represented by the reference document. The example illustrated in FIG. 3 also illustrates some of the different data types that are possible. For example, in the column represented by 302 (Nominal Thickness Tensile Properties), the data type for the attribute value corresponds to a range data type. As another example, in the column represented by 303 (Tensile Strength), the data type for the attribute value corresponds to a static data type.

At 102 the system, for example, via a user providing input to the user interface, receives a request for a similarity comparison based upon the reference document. The request may include an indication of similarity attributes to be used in the similarity comparison. In other words, the user may provide an indication of the attributes of the object corresponding to the reference document that are important or a priority when performing the similarity comparison. For example, the user may indicate a particular physical property or attribute that is important when performing the similarity comparison. An important attribute is one that the system should prioritize or weight more heavily when performing the similarity comparison and when generating a similarity attribute score and/or document similarity score as discussed in more detail below. The user can identify as few or as many attributes that should be prioritized or weighted during performance of the similarity comparison.

As described above, the user provides information to the system to access the reference document, for example, by providing search criteria for a particular object corresponding to the reference document within the user interface. Once the reference document, or a portion of the reference document, has been retrieved or presented to the user, the user may provide an indication that a similarity comparison should be performed. For example, the user may select an icon in the user interface that indicates the user wants to perform a similarity comparison based upon the reference document.

Figure 4:
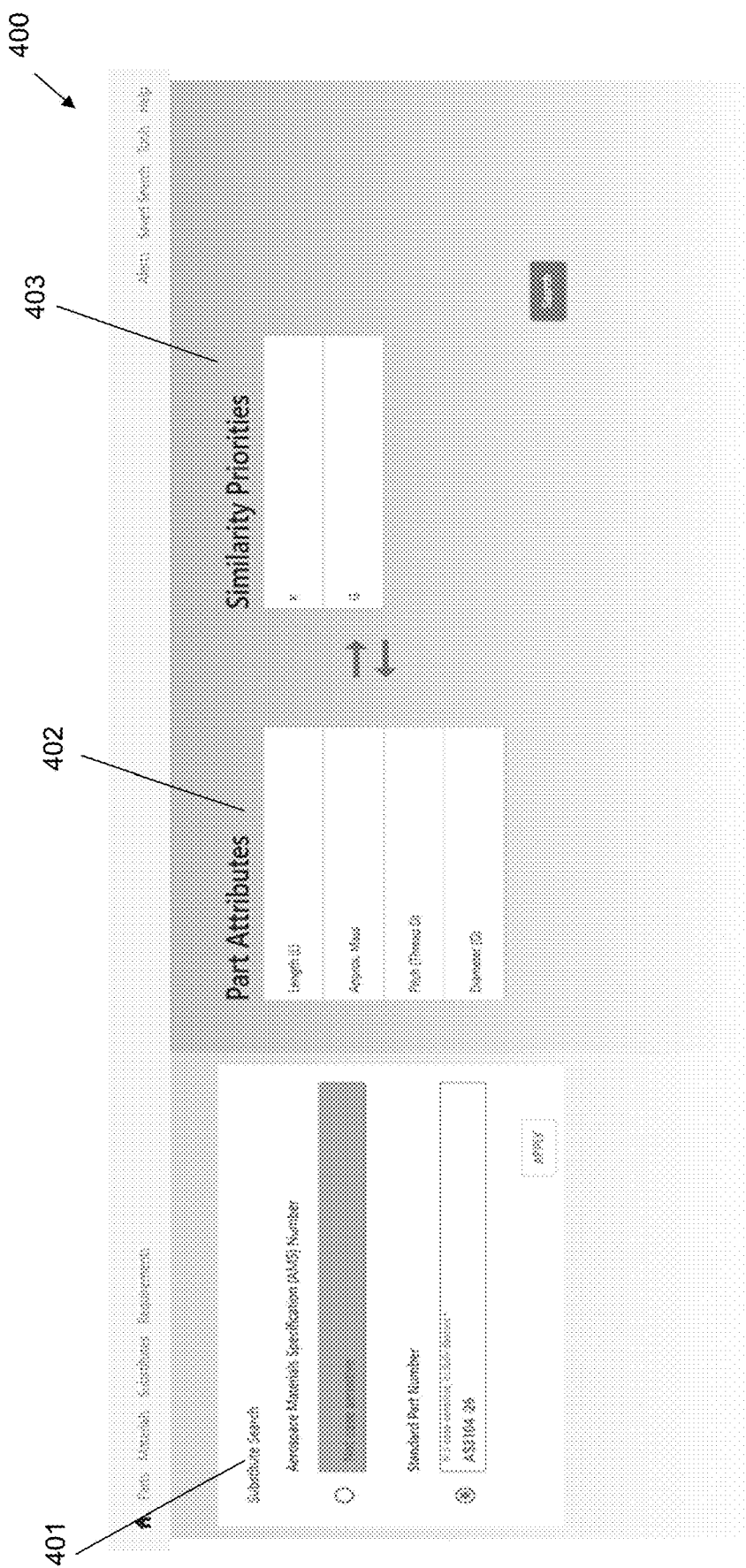
FIG. 4 illustrates an example substitute search user interface.

FIG. 4 illustrates an example user interface that the user may use to provide an indication of a similarity comparison request. This example user interface can be used to search for a digital standard using a substitution search. In this type of search, the user is not looking for a predetermined object. Rather, the user is looking for an object that can be used as a replacement for a predetermined object. Thus, in this case, the reference document has not been directly presented to the user. Instead, the user accesses the substitution search user interface and provides information regarding the object to the user interface, for example, with a search box 401 presented in the substitute search display 400.

The search box 401 illustrated in FIG. 4 shows two different radial buttons that a user can select to provide input for searching. Different layouts or numbers of search options are contemplated and possible. In this example, the user has selected the Standard Part Number search radial button. The user has also provided input to the field associated with the Standard Part Number search. This provided input may be the predetermined object number, or the object that the user is looking for a replacement or substitute to. The provided input may correspond to the digital standard identifier associated with that object. This provided input may be considered receiving the reference document at 101. In other words, even though the user is not directly presented with the reference document or a portion of the reference document within this display, the system still receives the reference document by accessing the data store to access the reference document that corresponds to the object information provided in the search box 401. Thus, receiving the reference document at 101 does not necessarily mean that the user will be directly provided with the reference document or a portion of the reference document. Rather, receiving the reference document at 101 means that the described system is receiving, obtaining, or otherwise accessing the reference document, regardless of whether this information is directly presented to the user.

Once the part number is provided, the system populates a table of attributes 402 that are associated with that part number. Thus, the types and number of attributes may be different for each part. In this example user interface, the user can provide an indication of the similarity attributes to be prioritized or weighted during the similarity comparison by dragging-and-dropping part attributes to the similarity priorities area 403. In the example of FIG. 4, attributes "K" and "G" were moved from the table of attributes 402 area to the similarity priority area 403. In this example interface, the user may order these attributes within the similarity priority area 403 based upon what attribute should be given the highest priority when searching for a substitute part. In this case, the "K" attribute will be given the highest priority. Once the user selects the search icon, the user will be presented with a table of objects that have similarities to the predetermined object. These will be sorted based upon the similarity priorities provided by the user. The user can also manipulate the displayed information, for example, by sorting and filtering on different attributes. Other user interfaces that allow the user to provide such information may have different functionality. For example, in a different user interface all of the attributes that are selected for the similarity comparison may be given the same weight or priority instead of having one selected attribute having a higher priority than another.

Figure 5:
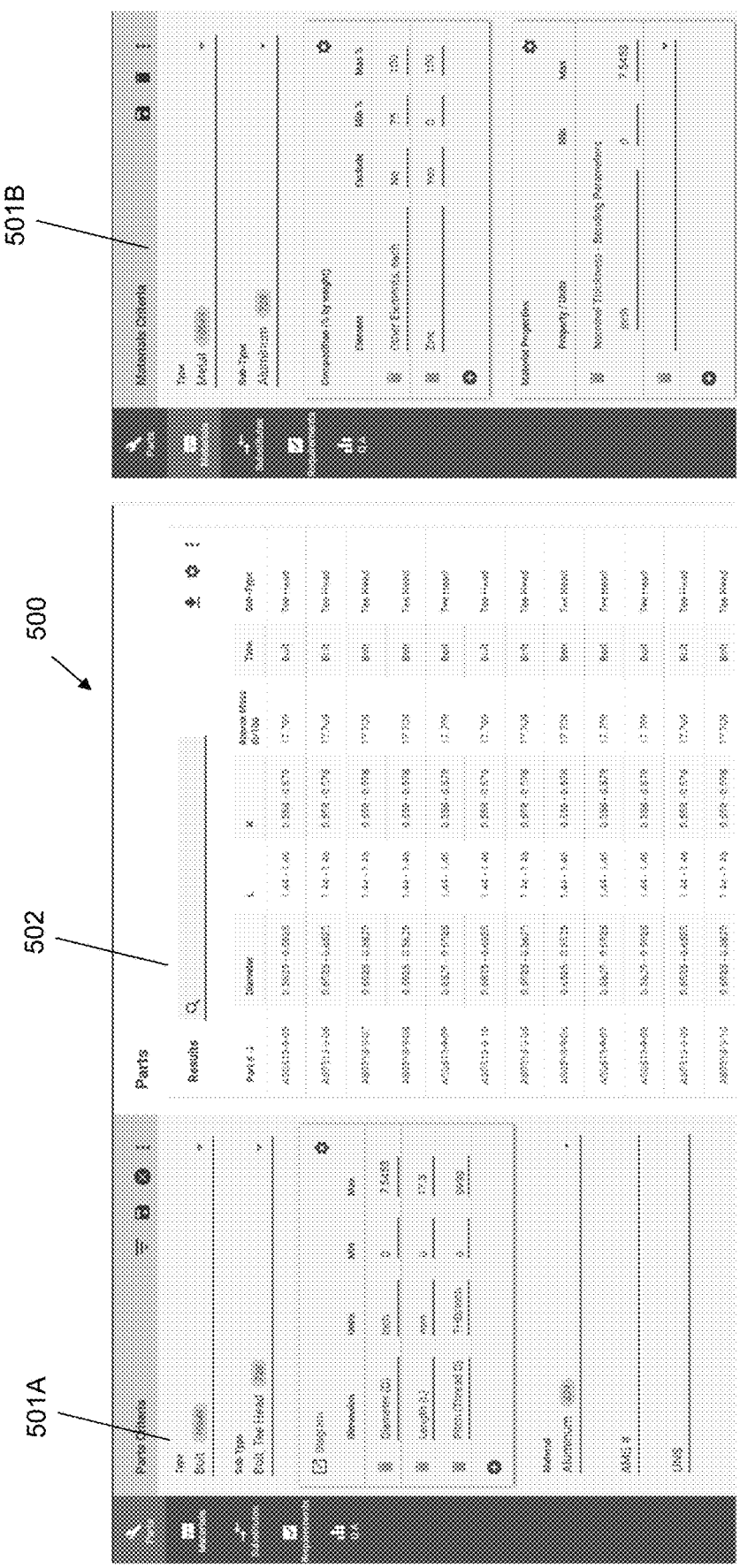
FIG. 5 illustrates an example of a digital standards search and filtering functionality.

FIG. 5 illustrates another example user interface that allows the user to provide information corresponding to a desired object and provides results. This example illustrates another type of similarity searching technique. In this case, instead of the user providing a specific object number as illustrated in FIG. 4, the user can provide attributes of an object. This is another type of similarity comparison where instead of attempting to find an object similar to a specific object, as illustrated in FIG. 4, the user can provide attribute criteria with the search fields 501A of a digital standards search display 500. These attributes can then be used as the reference document and used within the similarity comparison. The display illustrated at 501B illustrates an alternative display that may be presented when providing input of a different object, in this example, a material as opposed to a part as illustrated at 501A. Thus, as illustrated, different objects may allow for input or selection of different attributes. Once all the search input and filters are provided, the system returns results 502 corresponding to objects and, therefore, digital standards, that fulfill the search input and filter constraints. These returned objects may be based upon the similarity comparison that is performed at 103.

At 103 the system performs the similarity comparison by comparing the reference document to each of a plurality of documents, each corresponding to other objects. Using the digital standards example, the system may compare the digital standard corresponding to the searched object or the attributes provided in the search fields to other digital standards documents that each correspond to an object different than the one of the reference document. The similarity comparison is performed across types and subtypes of the documents. In other words, in order to speed up the comparison, the system only compares documents having the same type and/or subtype. However, this is not strictly required. A type represents an overarching category and may correspond to an object category or type, for example, a material type, a part type, a regulation type, a standard type, or the like. For ease of understanding, some example types may include a nut, a bolt, a metal sheet, a fiber sheet, a transportation regulation, a strength standard, and the like. A subtype represents a more defined category of the type. Using the nut example, the subtype may be a plain hexagon drilled nut. As another example, the subtype of the metal sheet may be a carbon and low alloy steel sheet.

The documents may include attributes that have data types that are different within the documents. For example, in one location within the document the data type for an attribute value may be a static data type, whereas within another location in the document the data type for a similar attribute value may be a range. As an example, in one location within the document the data type for a tensile strength attribute may be a static data type, whereas within another location of the document may have the data type for a tensile strength attribute as a range data type. Accordingly, the system must be able to compare different value data types. Thus, in performing the similarity comparison, the system may first substitute the data type for the similarity attributes (i.e., the attributes identified by the user to be used in the similarity comparison) with a defined data type so that comparisons of attributes across the documents are done in view of the same data type. In other words, the system substitutes the data types for the attributes so that attributes to be compared across documents are represented by the same data type.

To assist in understanding, a few examples of substituting data types will be described. However, different data types may be used in the substitution and attributes may be represented by different data types. In these examples, the attributes may be represented by a range data type which represents an interval of continuous values, a string data type which represents a discrete real number, and a string data type which represents a string of characters (e.g., letters, numbers, symbols, etc.). Additionally, a user may provide a desired attribute which will be defined as having a nominal value type. The nominal value is a value that the user wants to achieve for a particular attribute. Any value within some distance to the nominal value is permissible. This distance may be user defined, system defined, or the like.

In the example substitutions, the substitute value types will be a range substitute value type and a set substitute value type. The range substitute value type is represented as an interval of continuous values. The set substitute value type is represented as a string, whole integer value, or set of whole integer values. If the attribute can be represented by a value type that includes a range value type, the substitute value type will be a range substitute value type. In other words, if the attribute could be represented within the document as having a value type that includes the range value type, the substitute value type will be a range substitute value type. Additionally, an attribute having the nominal value type will be converted to a range substitute value type. In other words, the nominal value will have a substitute value type of a range substitute value type that is derived from the nominal value type. If the attribute can be represented as any value type not including a range value type (e.g., static, string, etc.), the substitute value type will be a set substitute value type. In other words, the set substitute data type may be utilized for any attribute that could have a possible data type that does not include a range data type. For example, an attribute that could be represented as a string data type, static data type, and/or the like, but not a range data type would be represented by a set substitute data type.

Once the similarity attributes have the substitute data types, the similarity comparison can then be performed for each of the similarity attributes with the substitute data types. The comparison that is performed may be based upon the substitute data type. For example, attributes having a range substitute data type may undergo a different comparison than attributes having a set substitute data type. A few example similarity comparisons based upon substitute data type will be described in order to provide understanding. However, these are merely examples and other techniques can be used to perform the similarity comparison for these substitute data types and other similarity comparisons for other substitute data types may be performed. In describing these similarity comparisons, the reference document will be referred to as RD or reference document and the document that the reference document is being compared to will be referred to as LD or lookup document. Additionally, the property or attribute that is being compared will be referred to as Pa or target similarity attribute.

In performing the range substitute data type comparison, the system compares the lookup document against the reference document with respect to the target similarity attribute. Specifically, the system determines a distance of a minimum value of the range of the target similarity attribute within the lookup document with respect to the minimum value of the range of the target similarity attribute within the reference document. The system also determines a distance of the maximum value of the range of the target similarity attribute within the lookup document with respect to the maximum value of the range of the target similarity attribute within the reference document. From these values, the system can compute a score for the target similarity attribute. An example distance equation that may be used is as follows:

$$\frac{(Pa\ \text{Max}\ (\varepsilon RD) - Pa\ \text{Max}\ (\varepsilon LD)) + (Pa\ \text{Min}\ (\varepsilon RD) - Pa\ \text{Min}\ (\varepsilon LD))}{Pa\ \text{Max}\ (\varepsilon RD) - Pa\ \text{Min}\ (\varepsilon RD)}$$

In order to perform a more accurate comparison across many documents, the system may normalize the range of the target similarity attribute within the reference document. Thus, the system may compute the similarity attribute score can be computed from the result or score of the above computation by subtracting the result from 1.

Different resulting similarity attribute scores may designate different amounts or degrees of similarity of the similarity attribute across the documents being compared. For example, an similarity attribute score of 1 indicates an exact match of the target similarity attribute between the reference document and the lookup document. As another example, an similarity attribute score of 0 indicates that the target similarity attribute value with the lookup document is a reference document range apart from the reference document target similarity attribute value. As an example, if the range of the target similarity attribute in the reference document is between 1 and 5, an similarity attribute score of 0 indicates that within the lookup document the value of the target similarity attribute is 4 away from the range within the reference document, for example, in the lookup document the range of the target similarity attribute may be between 5 and 9. More negative similarity attribute scores indicate a larger distance of the value of the target similarity attribute within the lookup document from the value of the target similarity attribute within the reference document. For example, an similarity attribute score of −4 indicates that the value of the look up document target similarity attribute is five times the reference document range apart from the value of the reference document target similarity attribute.

The user can define how far away from the reference document target similarity attribute value should correlate to a similarity. For example, the user may define that anything other than an exact match is identified as not similar. Additionally, the user can define whether the range can be relaxed and, if so, by how much. For example, the user may define that a range of the lookup document within a particular tolerance to the range of the reference document should be identified as an exact match. As an example, the user may define that the reference document range plus or minus three is still considered an exact match.

In order to prevent bias in the overall score computation, the system may scale the similarity attribute score values. The scale may be from 0 to 1. Since the similarity attribute score values can be anywhere from 1 to an infinite negative value, the negative values have to be scaled within the desired score. Thus, the system may identify a particular negative value to be equal to 0 and any value less than this selected negative value will be scaled to 0. Any negative value between the selected negative value and 1 will be scaled to a value between 0 and 1 based upon the scaling factor used. For example, if the system selects the negative value as −5, then any similarity attribute score values of −5 or less will be made equal to 0. Any similarity attribute score values greater than −5 but less than 1 will be scaled to a value between 0 and 1 based upon the −5 scaling factor. The user can provide an indication or define which negative value will be set equal to 0 and used for the scaling factor. This scaled value may then be used as the new similarity attribute score value.

As identified above, a nominal data type is converted to a range substitute value type, so the above described procedure can be used for the nominal data type. However, the nominal data type must first be converted to the range substitute value type. To perform this conversion the system performs a statistical analysis of both the nominal data types within the document and the range data types within the document to identify the distribution of each of these value types within the document. The system then determines the delta and percent rate of change for each of these value types. Determining the delta may include subtracting the minimum value within the distribution from the average value within the distribution. Determining the percent rate of change may include subtracting the average value within the distribution from the maximum value within the distribution and dividing this result by the average value within the distribution. Upon identifying which change (i.e., delta change or percent rate of change) is more constant across the document, the system sets the minimum value for the range substitute value type for the nominal value as the result of subtracting the more constant change from the nominal value, for example, the nominal value minus the delta change or the nominal value minus the percent rate of change with the selected change being the more constant one. Similarly, the system sets the maximum value for the range substitute value type for the nominal value as the result of adding the more constant change to the nominal value, for example, the nominal value plus the delta change or the nominal value plus the percent rate of change with the selected change being the more constant one, which should be the same as the one used for setting the minimum value.

To perform a similarity comparison for the set substitute value type, the system simply identifies the values within the lookup document that are exactly similar to or found within the values in the reference document. An similarity attribute score can then be calculated in a similar manner as discussed above with respect to the range substitute value type. In other words, the system can assign an similarity attribute score to each of the attributes based upon whether the values of the reference document occur within the values of the lookup document and how many values are the same. The similarity attribute score may then be normalized and scaled so that these attributes are defined along the same scale as the attributes having the range substitute value type.

Since the value types are substituted for a single document, the reference document and a lookup document may end up having different substitute value types. For example, the reference document may have a range substitute data type for an attribute, whereas the lookup document may have a set substitute data type for the same or similar attribute. Thus, the system can also perform a similarity comparison for attribute value types that are different across documents. For example, the system can perform a similarity comparison if the reference document has a range substitute value type for the target similarity attribute and the lookup document has a set substitute value type for the target similarity attribute. Both a range substitute value type versus range substitute value type comparison and a set substitute value type versus set substitute value type comparison have been described above. If the reference document includes a set substitute value type and the lookup document includes a range substitute value type, the set substitute value type versus set substitute value type comparison can be utilized.

On the other hand, if the reference document includes a range substitute value type and the lookup document includes a set substitute value type, the system must take additional steps. When comparing the range to a static value, the resulting value is actually a divide by zero error because the maximum and minimum values are the same and subtracting one from the other would result in a value of 0, which would be placed in the bottom of the distance equation. Additionally, if the minimum or maximum value of the range is null, then the system cannot perform the computation because there is no value to put within the distance formula described above.

Accordingly, the system utilizes the average range of the target similarity attribute. The average range is the average computed from the property ranges across all documents that have the type and subtype of the reference document. This allows the system to effectively convert the set substitute value type to a range. The minimum value of the range for the set substitute value type will be the difference of subtracting the average range divided by 2 from the static value (i.e., min=static value−(average range/2)). The maximum value of the range for the set substitute value type will be the product of adding the average range divided by 2 from the static value (i.e., min=static value+(average range/2)). Any null values can also be substituted with a value. Specifically, a range having a minimum null value can be replaced with the difference of the maximum range value minus the average range (i.e., minimum=maximum−average range) and a range having a maximum null value can be replaced with the product of the minimum range value plus the average range (i.e., maximum=minimum+average range).

Once all the similarity comparisons are performed for a lookup document across the similarity attributes, each similarity attribute will have a similarity attribute score, which may be a scaled similarity attribute score. From the similarity attribute scores, the system can generate a document similarity score for each of the documents that were compared to the reference document. In other words, the system generates a document similarity score for each of the lookup documents in view of the reference document. To generate the document similarity score, the system aggregates the similarity attribute scores that were calculated for each of the similarity attributes of the document. In other words, each lookup document will have one or more similarity attribute scores. To generate the document similarity score, the system aggregates all of the similarity attribute scores for that lookup document. As mentioned before, in order to prevent bias in the computation, the similarity attribute scores may be scaled. Accordingly, these scaled similarity attribute scores may be used in generating the document similarity score. An aggregation may simply be a compilation of the similarity attribute scores, an average of the similarity attribute scores, or some other type of computation. The key is that each of the document similarity scores across the plurality of documents is generated using the same computation technique.

Once the document similarity scores are generated, the system can determine if any of the document similarity scores indicate a similarity within a particular threshold to the reference document at 104. This determination may simply be a comparison of the document similarity score to a predetermined value or threshold, referred to as similarity criteria. The predetermined value or threshold may be a system default or set or defined by a user. If one or more of the plurality of documents do not provide an indication of a similar document, and therefore, indicates that the system cannot find an object similar to the object defined by the user input, then the system may take no action or provide an indication of no similar object to the user at 106. The system may also provide an indication of an attribute or user input that caused the system to be unable to identify a similar object. For example, if the user defined a particular attribute as important, but no other object has that same attribute value, the system may indicate that it was the definition of that attribute that resulted in no similar object.

On the other hand, if the system determines that the at least one of the plurality of documents fulfills the similarity criteria, the system provides the document fulfilling the similarity criteria to the user at 105. The system may also provide an indication of the similarity of the document to the reference document. The indication of the similarity may be based upon the document similarity score corresponding to the provided document(s). The indication may include a ranking of the documents based upon the similarity score. For example, a document having a score indicating more similarity to the reference document may be provided first in a list that has the documents sorted in an order of similarity with less similar documents being lower in the list. Additionally or alternatively, the system may provide the documents with the corresponding similarity score. Without a ranking, the user can use the similarity scores to determine the documents that are more similar.

The system may also provide other information when providing the documents. For example, the system may provide an indication of what attributes were found to be more similar between the reference document and the lookup document. As another example, the system may provide the attribute similarity scores. This information may also be provided when the user provides an input to display or provide this information. For example, the user may select an attribute within the lookup document and, upon providing this selection, the system may provide the attribute similarity score. The documents can also be ranked or displayed in an order based upon other inputs. For example, if the user needs to order a part, the system may rank the similar documents based upon an availability of the part corresponding to the document. How the documents are presented and what information is displayed with the documents can be configured by the user.

Figure 6:
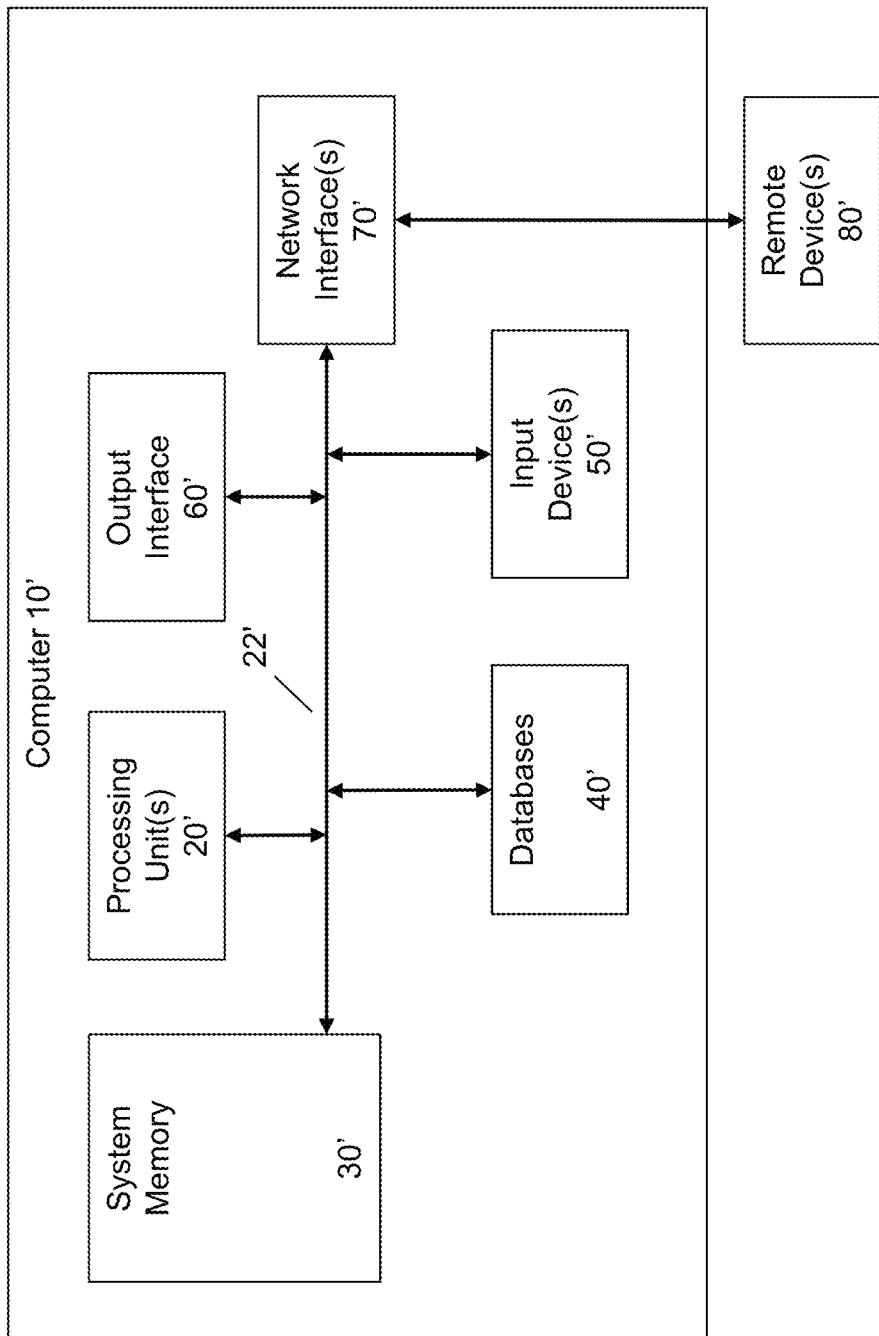
FIG. 6 illustrates an example of device circuitry.

While various other circuits, circuitry or components may be utilized in information handling devices, with a computer, server, client device or the like, an example device that may be used in implementing one or more embodiments includes a computing device in the form of a computer 10' as illustrated in FIG. 6. This example device may be a server used in one of the systems in a network, or one of the remote computers connected to the network. Components of computer 10' may include, but are not limited to, a processing unit 20', a system memory 30', and a system bus 22' that couples various system components including the system memory 30' to the processing unit 20'. Computer 10' may include or have access to a variety of computer readable media, including databases. The system memory 30' may include non-signal computer readable storage media, for example in the form of volatile and/or nonvolatile memory such as read only memory (ROM) and/or random access memory (RAM). By way of example, and not limitation, system memory 30' may also include an operating system, application programs, other program modules, and program data.

A user can interface with (for example, enter commands and information) the computer 10' through input devices 50' (e.g., keyboard, soft keyboard, mouse, auditory inputs, haptic inputs, gesture inputs, etc.). A monitor or other type of device can also be connected to the system bus 22' via an interface, such as an output interface 60'. The computer may include a database 40'. In addition to a monitor, computers may also include other peripheral output devices. The computer 10' may operate in a networked or distributed environment using logical connections to one or more other remote device(s) 80' such as other computers. The logical connections may include network interface(s) 70' to a network, such as a local area network (LAN), a wide area network (WAN), and/or a global computer network, but may also include other networks/buses.

Information handling device circuitry, as for example outlined in FIG. 5, may be used in client devices such as a personal desktop computer, a laptop computer, or smaller devices such as a tablet or a smart phone. In the latter cases, i.e., for a tablet computer and a smart phone, the circuitry outlined in FIG. 5 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 5 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for identifying similar objects by performing document attribute comparisons, the method comprising:

providing a digital standard system comprising a user interface, at least one machine-learning model, and at least one data store comprising a plurality of digital standards, wherein each of the plurality of digital standards comprises a digital format of an underlying standard formatted, by the digital standard system using the at least one machine-learning model to classify conceptual units extracted from the underlying standard format and store the classified conceptual units into the at least one data store, into a data structure and data model describing interactions and relationships of aspects within the underlying standard as identified from the classified conceptual units, wherein the digital standard system provides digital functionality allowing a user to interact with and view the plurality of digital standards, the digital functionality being facilitated via the digital format of the underlying standard, wherein the data structure and the data model provide a consistent format for the plurality of digital standards and identifies a data type for attributes of objects represented by the plurality of digital standards, wherein the data type corresponds to a format of an attribute within a digital standard, wherein the plurality of digital standards have disparate data types across similar attributes;

displaying, on a display device, the user interface of the digital standard system and allowing user interaction with the digital standard system via the user interface;

receiving, from an input device and within an input field of the user interface of the digital standard system, a reference document, wherein the reference document corresponds to an object and comprises a plurality of attributes of the object, each of the attributes having a data type;

receiving, from a user providing input to at least one input area within the user interface, a request for a similarity comparison based upon the reference document, wherein the request provides an indication of similarity attributes corresponding to attributes of the object to be compared with attributes of other objects during the similarity comparison;

comparing, using the digital standard system, the reference document to each digital standard of a group of digital standards of the plurality of digital standards that correspond to other objects having a same type as the reference document and located within the at least one data store, wherein the comparing comprises making the data types for the similarity attributes the same across the reference document and the group of digital standards by substituting a data type of each of the similarity attributes received from the user with a defined data type and performing a comparison of the similarity attributes having the substitute data types, wherein the comparison performed is based upon the substitute data type of a given similarity attribute and is facilitated via the digital format of the underlying standard;

generating, using the digital standard system, a document similarity score for each of the digital standards within the group based upon the comparing, wherein the document similarity score is generated based upon an aggregation of similarity attribute scores calculated for each of the similarity attributes and being determined from the comparison; and displaying, to the user within the user interface, at least one of the digital standards within the group with an indication of a similarity of the at least one of the digital standards within the group to the reference document, the indication of similarity being based upon a document similarity score corresponding to the at least one of the digital standards within the group, wherein the at least one of the digital standards displayed is different than the reference document and is a replacement for the object corresponding to the reference document.

2. The method of claim 1, wherein attributes being similar within a given document have a plurality of different data types.

3. The method of claim 2, wherein the substitute data type comprises a range substitute data type and wherein the range substitute data type is utilized for attributes having a plurality of different data types including a range data type.

4. The method of claim 3, wherein the comparing comprises determining a minimum value distance of a minimum value of the similarity attribute within a given of the digital standards within the group with respect to a minimum value of the similarity attribute within the reference document, determining a maximum value distance of a maximum value of the similarity attribute within a given of the digital standards within the group with respect to a maximum value of the similarity attribute within the reference document, and normalizing a range of the similarity attribute within the reference document.

5. The method of claim 2, wherein the substitute data type comprises a set substitute data type and wherein the set substitute data type is utilized for attributes having a plurality of different data types not including a range data type.

6. The method of claim 1, wherein the comparing comprises comparing similarity attributes having different data types between the reference document and a document of the digital standards within the group being compared.

7. The method of claim 1, wherein at least one of the similarity attributes comprises a nominal data type defining a value the user wants to achieve for the attribute and wherein the substitute data types comprises a range substitute data type derived from the nominal data type.

8. The method of claim 1, wherein the generating comprises normalizing each of the similarity attribute scores assigned to each of the similarity attributes.

9. The method of claim 1, wherein both the reference document and each of the digital standards within the group comprise standards documents.

10. The method of claim 1, wherein the object comprises at least one of: a material and a part.

11. A system for identifying similar objects by performing document attribute comparisons, the system comprising:
one or more processors;
a memory device that stores instructions executable by the processor to:
provide a digital standard system comprising a user interface, at least one machine-learning model, and at least one data store comprising a plurality of digital standards, wherein each of the plurality of digital standards comprises a digital format of an underlying standard formatted, by the digital standard system using the at least one machine-learning model to classify conceptual units extracted from the underlying standard format and store the classified conceptual units into the at least one data store, into a data structure and data model describing interactions and relationships of aspects within the underlying standard as identified from the classified conceptual units, wherein the digital standard system provides digital functionality allowing a user to interact with and view the plurality of digital standards, the digital functionality being facilitated via the digital format of the underlying standard, wherein the data structure and the data model provide a consistent format for the plurality of digital standards and identifies a data type for attributes of objects represented by the plurality of digital standards, wherein the data type corresponds to a format of an attribute within a digital standard, wherein the plurality of digital standards have disparate data types across similar attributes;

display, on a display device, the user interface of the digital standard system and allowing user interaction with the digital standard system via the user interface;

receive, from an input device and within an input field of the user interface of the digital standard system, a reference document, wherein the reference document corresponds to an object and comprises a plurality of attributes of the object, each of the attributes having a data type;

receive, from a user providing input to at least one input area within the user interface, a request for a similarity comparison based upon the reference document, wherein the request provides an indication of similarity attributes corresponding to attributes of the object to be compared with attributes of other objects during the similarity comparison;

compare, using the digital standard system, the reference document to each digital standard of a group of digital standards of the plurality of digital standards that correspond to other objects having a same type as the reference document and located within the at least one data store, wherein the comparing comprises making the data types for the similarity attributes the same across the reference document and the group of digital standards by substituting a data type of each of the similarity attributes received from the user with a defined data type and performing a comparison of the similarity attributes having the substitute data types, wherein the comparison performed is based upon the substitute data type of a given similarity attribute and is facilitated via the digital format of the underlying standard;

generate, using the digital standard system, a document similarity score for each of the digital standards within the group based upon the comparing, wherein the document similarity score is generated based upon an aggregation of similarity attribute scores calculated for each of the similarity attributes and being determined from the comparison; and display, to the user within the user interface, at least one of the digital standards within the group with an indication of a similarity of the at least one of the digital standards within the group to the reference document, the indication of similarity being based upon a document similarity score corresponding to the at least one of the digital standards within the group, wherein the at least one of the digital standards displayed is different than the reference document and is a replacement for the object corresponding to the reference document.

12. The system of claim 11, wherein attributes being similar within a given document have a plurality of different data types.

13. The system of claim 12, wherein the substitute data type comprises a range substitute data type and wherein the range substitute data type is utilized for attributes having a plurality of different data types including a range data type.

14. The system of claim 13, wherein the comparing comprises determining a minimum value distance of a minimum value of the similarity attribute within a given of the digital standards within the group with respect to a minimum value of the similarity attribute within the reference document, determining a maximum value distance of a maximum value of the similarity attribute within a given of the digital standards within the group with respect to a maximum value of the similarity attribute within the reference document, and normalizing a range of the similarity attribute within the reference document.

15. The system of claim 12, wherein the substitute data type comprises a set substitute data type and wherein the set substitute data type is utilized for attributes having a plurality of different data types not including a range data type.

16. The system of claim 11, wherein the comparing comprises comparing similarity attributes having different data types between the reference document and a document of the digital standards within the group being compared.

17. The system of claim 11, wherein at least one of the similarity attributes comprises a nominal data type defining a value the user wants to achieve for the attribute and wherein the substitute data types comprises a range substitute data type derived from the nominal data type.

18. The system of claim 11, wherein the generating comprises normalizing each of the similarity attribute scores assigned to each of the similarity attributes.

19. The system of claim 11, wherein both the reference document and each of the digital standards within the group comprise standards documents.

20. A product for identifying similar objects by performing document attribute comparisons, the product comprising:

a storage device that stores code, the code being executable by one or more processors and comprising:

code that provides a digital standard system a user interface, at least one machine-learning model, and at least one data store comprising a plurality of digital standards, wherein each of the plurality of digital standards comprises a digital format of an underlying standard formatted, by the digital standard system using the at least one machine-learning model to classify conceptual units extracted from the underlying standard format and store the classified conceptual units into the at least one data store, into a data structure and data model describing interactions and relationships of aspects within the underlying standard as identified from the classified conceptual units, wherein the digital standard system provides digital functionality allowing a user to interact with and view the plurality of digital standards, the digital functionality being facilitated via the digital format of the underlying standard, wherein the data structure and the data model provide a consistent format for the plurality of digital standards and identifies a data type for attributes of objects represented by the plurality of digital standards, wherein the data type corresponds to a format of an attribute within a digital standard, wherein the plurality of digital standards have disparate data types across similar attributes;

code that displays, on a display device, the user interface of the digital standard system and allowing user interaction with the digital standard system via the user interface;

code that receives, from an input device and within an input field of the user interface of the digital standard system, a reference document, wherein the reference document corresponds to an object and comprises a plurality of attributes of the object, each of the attributes having a data type;

code that receives, from a user providing input to at least one input area within the user interface, a request for a similarity comparison based upon the reference document, wherein the request provides an indication of similarity attributes corresponding to attributes of the object to be compared with attributes of other objects during the similarity comparison;

code that compares, using the digital standard system, the reference document to each digital standard of a group of digital standards of the plurality of digital standards that correspond to other objects having a same type as the reference document and located within the at least one data store, wherein the comparing comprises making the data types for the similarity attributes the same across the reference document and the group of digital standards by substituting a data type of each of the similarity attributes received from the user with a defined data type and performing a comparison of the similarity attributes having the substitute data types, wherein the comparison performed is based upon the substitute data type of a given similarity attribute and is facilitated via the digital format of the underlying standard;

code that generates, using the digital standard system, a document similarity score for each of the digital standards within the group based upon the comparing, wherein the document similarity score is generated based upon an aggregation of similarity attribute scores calculated for each of the similarity attributes and being determined from the comparison; and code that displays, to the user within the user interface, at least one of the digital standards within the group with an indication of a similarity of the at least one of the digital standards within the group to the reference document, the indication of similarity being based upon a document similarity score corresponding to the at least one of the digital standards within the group, wherein the at least one of the digital standards displayed is different than the reference document and is a replacement for the object corresponding to the reference document.

* * * * *